Fig.1A.

June 17, 1947.    R. A. GEISELMAN ET AL    2,422,539
CONTROL SYSTEM
Filed April 21, 1945    2 Sheets-Sheet 2

Fig. 1B.

WITNESSES:

INVENTORS
Ralph A. Geiselman
and James P. Houck.
BY
ATTORNEY

Patented June 17, 1947

2,422,539

UNITED STATES PATENT OFFICE 2,422,539

CONTROL SYSTEM

Ralph A. Geiselman and James P. Houck, Pittsburgh, Pa., assignors to Westinghouse Electric Corporation, East Pittsburgh, Pa., a corporation of Pennsylvania Application April 21, 1945, Serial No. 589,663

18 Claims. (Cl. 314—75)

This invention relates to arc furnace control systems, and in particular to regulating systems for governing the operation of the movable electrodes in electric furnaces.

An object of this invention is to provide in a furnace regulating system for controlling the positioning of an electrode of the furnace, means for automatically adjusting the regulating apparatus in accordance with a change in the input to the furnace to maintain positional control of the electrode.

A further object of this invention is the provision in a furnace regulating system utilizing a dynamo-electric machine having opposed field windings responsive respectively to the current and potential of the electrode arc for controlling the position of the electrode, to automatically adjust the energization of the field windings in accordance with a change in the input to the furnace to maintain positional control of the electrodes.

Another object of this invention is the provision in a furnace regulating system for an arc furnace supplied from a polyphase power source for simultaneously controlling the phases to maintain a balanced relationship between the phase currents.

A further object is to provide in a furnace regulating system for controlling the position of an electrode, means to maintain the current and potential of the regulating means substantially uniform for different amounts of current supplied to the power system of the arc furnace for adjusting the position of a furnace electrode with respect to the arc potential.

Other objects of this invention will be better understood from the following description when taken in conjunction with the accompanying drawing in which Figs. 1A and 1B form a composite drawing illustrating diagrammatically the circuits and apparatus embodying the teachings of this invention.

Figure 1A:
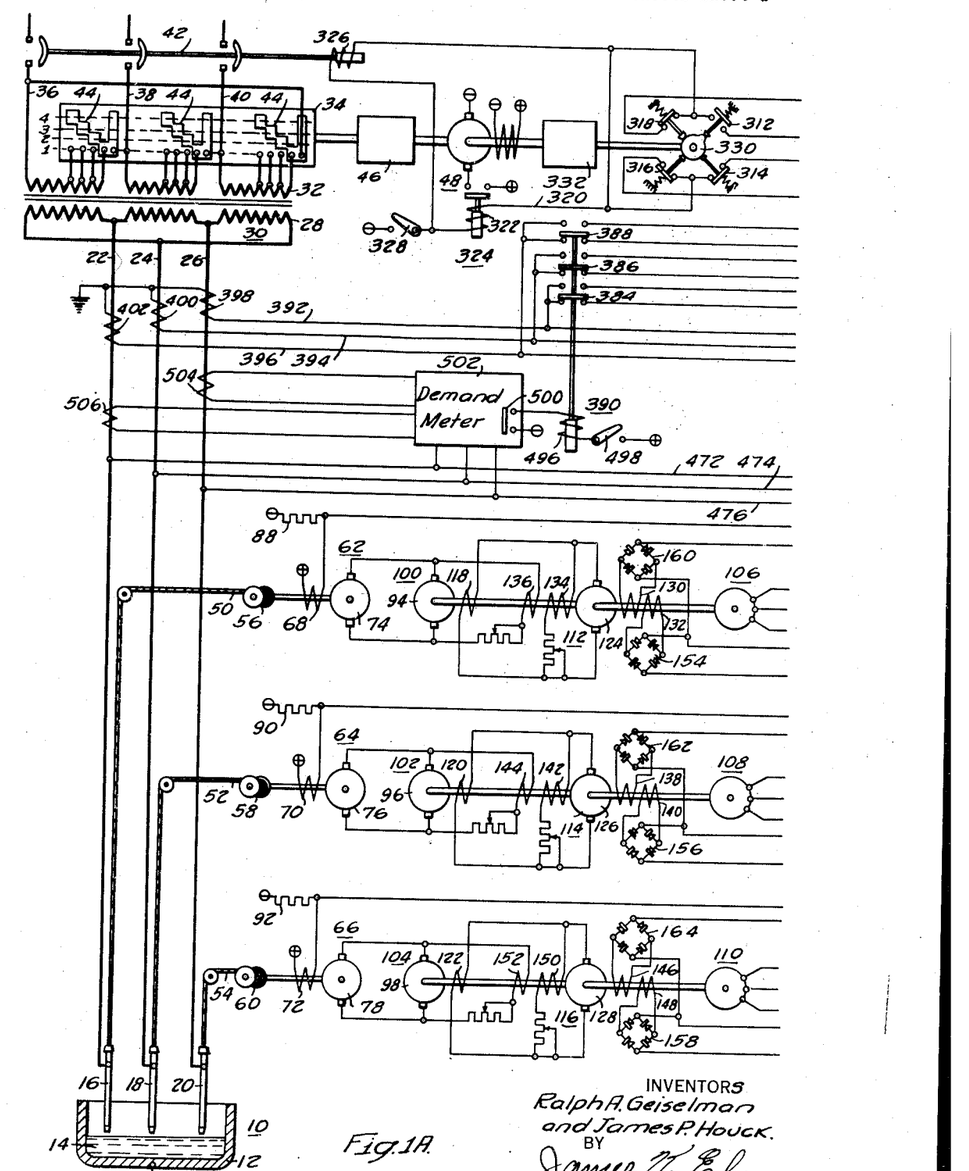
Figure 1B:
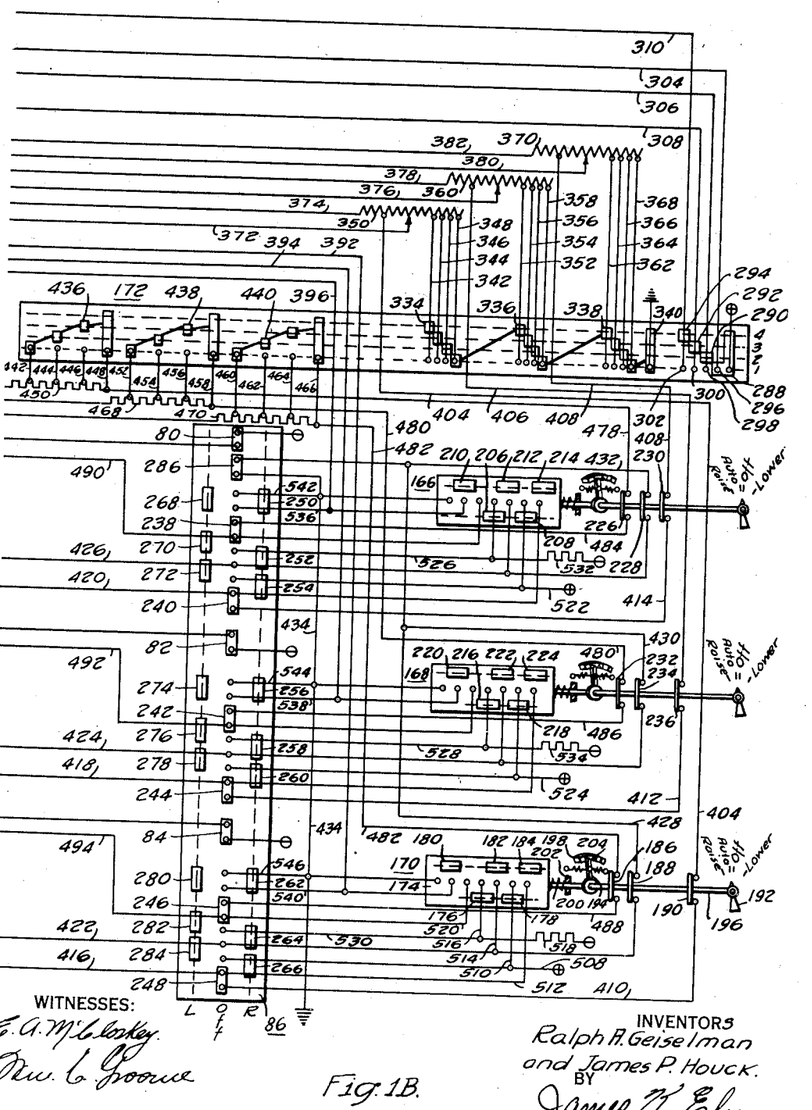

Referring to the drawing an electric furnace 10 is illustrated, the furnace comprising a receptacle 12 containing a bath of material 14 and three movable electrodes 16, 18 and 20. The electrodes 16, 18 and 20 are connected by conductors 22, 24, and 26, respectively, to the secondary windings 28 of a power transformer 30, the primary windings 32 of which are connected through a tap changing controller 34 and conductors 36, 38 and 40 to a source of supply (not shown) a circuit breaker 42 being interposed in the conductors 36, 38 and 40. The tap changing controller 34 illustrated is a four position drum having three spaced stepped segments 44 disposed to be actuated to connect different sections of the primary windings 32 in circuit with the source of supply to control the power supplied to the furnace circuit. The controller 34 is disposed to be driven through a suitable gear drive 46 by a motor 48 which is energized under predetermined conditions as will be explained hereinafter.

As illustrated, flexible cables 50, 52 and 54 connected to electrodes 16, 18 and 20, respectively, are disposed to be wound on winding drums 56, 58 and 60 respectively, operated by motors 62, 64 and 66 respectively. The motors 62, 64 and 66 comprise a field winding 68, 70 and 72, respectively, and an armature winding 74, 76 and 78 respectively. The field windngs 68, 70 and 72 are normally connected through segments 80, 82 and 84, respectively, of a master controller 86 when the controller 86 is in the "off" position as shown across a direct current source represented by the positive and negative terminals or through resistors 88, 90 and 92, respectively, to the negative terminal when the master controller 86 is in either the "raise" or "lower" position.

The armature windings 74, 76 and 78 are connected across the armature windings 94, 96 and 98, respectively, of main generators 100, 102 and 104, respectively, to be supplied with energy therefrom, the generators being disposed to be driven by alternating current motors 106, 108 and 110, respectively, and excited from exciter generators 112, 114 and 116, respectively. The main generators 100, 102 and 104 are also provided with field windings 118, 120 and 122, respectively, connected to be supplied with energy from armature windings 124, 126 and 128, respectively, of the exciter generators 112, 114 and 116, respectively.

The exciter generators 112, 114 and 116 are each provided with four field windings in the embodiment illustrated although other forms of the exciter generator or combination of main generator and exciter generator may be employed. In the embodiment illustrated, the exciter generator 112 is provided with two opposed control field windings 130 and 132, a self-excited winding 134 connected in shunt relation to the armature winding 124 and a differential field winding 136 connected to be energized in accordance with the output voltage of the main generator 100. Likewise the exciter generator 114 is provided with two opposed control field windings 138 and 140, a self-excited field winding 142 and a differential field winding 144 and the exciter generator 116 is provided with two opposed control field windings 146 and 148, a self-excited field winding 150 and a differential field winding 152. The control field windings 132, 140 and 146 are shown connected across rectifiers 154, 156 and 158, respectively, to be supplied therefrom with an unidirectional current that is a measure of the alternating current flowing through phase conductors 22, 24 and 26, respectively, in a manner hereinafter described, whereas the control field windings 130, 138 and 146 are connected across rectifiers 160, 162 and 164, respectively, which are connected in such a manner, to be hereinafter described, that the rectifiers will supply energy to the associated control field windings that is a measure of the drop in voltage across the arc of electrodes 16, 18 and 20, respectively.

In the control system for connecting the rectifiers associated with the two opposed control windings of each of the exciter generators 112, 114 and 116, a plurality of controllers are utilized for different purposes. The master controller 86 identified hereinbefore is employed for so controlling the excitation of the exciter generators 112, 114 and 116 as to effect a simultaneous change in the operation of the motors 62, 64 and 66 as to simultaneously raise or lower the electrodes 16, 18 and 20 depending upon the direction in which the controller 86 is manually actuated. Three controllers 166, 168 and 170 are associated with the exciter generators 112, 114 and 116, respectively, for independently controlling the raising or lowering of the electrodes 16, 18 and 20, respectively. Also a four position tap changing controller 172 is disposed for manual operation to simultaneously control the operation of the tap changing motor 48 and the excitation of the two opposed control field windings of each of the exciter generators 112, 114 and 116 as will be explained more fully hereinafter.

The controllers 166, 168 and 170 are similar and for simplicity of this description the details of only controller 170 will be discussed. The controller 170 comprises a drum 174 disposed for predetermined rotational and slidable movement whereby segments 176 and 178 or segments 180, 182 and 184 are selectively moved to "raise" or "lower" or to "off" or "automatic" positions. In the position shown, the controller 170 is in the "automatic" position with the segments of the drum out of alignment with the pairs of contact fingers which they will bridge in the "raise" or "lower" positions. In this position, three contact members 186, 188 and 190 engage contact fingers whereby control of the energization of the control field windings 146 and 148 lies in the positioning of the master controller 86 and the tap changing controller 172.

In this position, the handle 192 is in the "automatic" position and a finger 194 carried on the shaft 196 is positionally held by opposed springs on one side of an arcuate stop plate 198 to maintain a spring member 200 compressed between the drum 174 and a stop 202. The arcuate stop plate 198 is provided with a notch 204 so that when the handle 192 is physically moved to the "off" position, the finger 194 is moved to a position where it is in alignment with the notch 204 and can pass therethrough to the other side of the arcuate stop member 198 and the force of the spring 200 effects a sliding movement of the drum 174 and segments thereon to a position where the segments can bridge associated pairs of contact fingers when the handle 192 is rotated to the "raise" or "lower" positions. The segments 206, 208, 210, 212 and 214 of controller 166 and segments 216, 218, 220, 222 and 224 of controller 168 correspond to segments 176, 178, 180, 182 and 184, respectively, of controller 170, controller 166 also being provided with contact members 226, 228 and 230 and controller 168 having contact members 232, 234 and 236 corresponding to contact members 186, 188 and 190, respectively, of controller 170.

The master controller 86 is provided with segments 238, 240 and 242, 244 and 246, 248 disposed in the "off" position for connecting the control field windings of exciter generators 112, 114 and 116, respectively, to sources of energy, and segments 250, 252, 254 and 256, 258, 260 and 262, 264, 266 disposed in the "raise" position and associated with the exciter generators 112, 114 and 116, respectively, and segments 268, 270, 272 and 274, 276, 278 and 280, 282, 284 disposed in the "lower" position associated with the exciter generators 112, 114 and 116, respectively. In addition to these segments a segment 286 is also provided in the "off" position, the purpose of which will become apparent hereinafter.

The tap changing controller 172 is provided with seven sets of four position segments disposed for simultaneous movement from one position to another position. As illustrated, one set of the segments comprise 288, 290, 292 and 294 electrically connected to each other and to ground. These segments are disposed to positionally engage contact fingers 296, 298, 300 and 302, respectively, to selectively close a circuit through conductors 304, 306, 308 and 310, respectively, to control the operation of the tap changing motor 48. The conductors 304, 306, 308 and 310 are disposed to be connected through contact members 312, 314, 316 and 318, respectively, to conductor 320 and the parallel circuit composed of the winding 322 of a contactor 324 and the winding 326 of circuit breaker 42 and switch 328 to the negative terminal of a source of supply, the positive terminal being connected as illustrated to the segment 288. The contact members 312, 314, 316 and 318 are normally spring biased to a circuit closing position but are disposed to be actuated to open circuit position by a rotating cam 330 operated through a suitable gear box 332 by the motor 48 to positionally open the energizing circuit of contactor 324 to deenergize the motor 48 when the tap changing controller is in a position corresponding to the position of controller 172. It is to be noted that when the motor 48 is energized for operation the circuit breaker 42 is also energized to actuate the breaker to the open circuit position and by correlating the time constants of the contactor 324 and the breaker 42, the breaker will be in open circuit position prior to and throughout any and all positional operation of the tap changing controller 34. The positions 1, 2, 3 and 4 of the tap changing controller 34 correspond to the positions 1, 2, 3 and 4 indicated for controller 172.

The controller 172 is also provided with three sets 334, 336 and 338 of four position segments corresponding to positions 1, 2, 3 and 4 of the controller electrically connected to each other and to a segment 340 which is connected to ground. Each set of segments is disposed to selectively engage a contact finger connected to a tap of an associated transformer. As illustrated, the set 334 is associated with contact fingers connected by conductors 342, 344, 346 and 348 to taps of an auto-transformer 350, the set 336 being associated with spaced contact fingers connected by conductors 352, 354, 356 and 358 to taps of an auto-transformer 360 and the set 338 is associated with contact fingers connected by conductors 362, 364, 366 and 368 to taps of an auto-transformer 370. It is to be noted that the conductors 372, 376 and 380 are connected to adjustable taps of transformers 350, 360 and 370, respectively, to permit adjustment in the setting of the transformers, a common handle (not shown) being employed for effecting simultaneous adjustment of the three phases. The sets 334, 336, and 338 of segments thus function to simultaneously change the tap connections of transformers 350, 360 and 370 to ground as the controller 172 is actuated to any one of the four positions.

The other ends of the primary windings of the transformers 350, 360 and 370 are disposed to be connected by conductors 372 or 374, 376 or 378 and 380 or 382, respectively, through contact members 384, 386 and 388, respectively, of a demand switch 390 and conductors 392, 394 and 396, respectively, to one end of current transformers 398, 400 and 402, respectively, associated with the conductors 26, 24 and 22, respectively, the other terminals of the current transformers being grounded.

The other terminals of the secondary windings of auto-transformers 350, 360 and 370 are connected to conductors 404, 406, and 408, respectively, through contact members 190, 236 and 230, respectively, of the individual controllers 170, 168 and 166, respectively, conductors 410, 412 and 414, respectively, segments 248, 244 and 240, respectively, of the master controller 86 and conductors 416, 418 and 420, respectively, to one terminal of the rectifiers 158, 156, and 154, respectively, the other terminal of the rectifiers being connected by conductors 422, 424 and 426 through contact members 188, 234 and 228, respectively, of the individual controllers 170, 168 and 166, respectively, conductors 428, 430 and 432, respectively, to segment 285 of the master controller 86 and from thence through conductor 434 to ground. The rectifiers 154, 156 and 158 thus are supplied in accordance with the current flowing in conductors 22, 24 and 26, respectively, as modified by the adjustment of the ground tap of auto-transformers 370, 360 and 350, respectively, in accordance with the positioning of the controller 172 in any one of its four positions.

The other three sets 436, 438 and 440 of segments on the controller 172 each comprise four segments electrically connected together and positioned corresponding to the four positions of the controller. The set 436 of segments is disposed to positionally engage contact fingers connected by conductors 442, 444, 446 and 448 to taps of a resistor 450 to selectively shunt sections therefrom, the sets 438 and 440 being similarly disposed to positionally engage contact fingers connected by conductors 452, 454, 456, 458 and 460, 462, 464, 466, respectively, to taps of resistors 468 and 470 respectively.

One terminal of the resistors 450, 468 and 470 is connected by conductors 472, 474 and 476, respectively, to conductors 22, 24 and 26, respectively, the other terminal of the resistors being connected by conductors 478, 480 and 482, respectively, through contact members 226, 232, and 186, respectively, of the controllers, 166, 168 and 170, respectively, conductors 484, 486 and 488, respectively, segments 238, 242 and 246, respectively, of the master controller 86 and conductors 490, 492, and 494, respectively, to one of the input terminals of the rectifiers 160, 162, and 164, respectively. The other input terminal of the rectifiers 160, 162 and 164 is connected through conductors 426, 424 and 422, respectively, to ground in the same manner as one of the terminals of the rectifiers 154, 156 and 158 referred to hereinbefore. The rectifiers 160, 162 and 164 are thus normally supplied in accordance with the potential across the arcs of electrodes 16, 18 and 20, respectively, as modified by the shunting of sections of resistors 450, 468 and 470, respectively, in accordance with the positioning of the controller 172 in any one of its four positions.

The demand switch 390 is provided with a winding 496 disposed to be connected by switch 498 and contact member 500 of a demand meter 502 across the positive and negative terminals of a source (not shown) of electrical energy under predetermined electrical conditions of the furnace. The demand meter 502 may be of any suitable type being illustrated schematically and being connected to current transformers 504 and 506 associated with conductors 22 and 26 and to conductors 472, 474 and 476 whereby the demand meter 502 is responsive to a predetermined kilowatt hour load of the furnace to actuate its contact member 500 to circuit closing position and effect the energization of the winding 496 to operate the demand switch 390. The effect of the operation of the demand switch 390 on the regulating system will be explained hereinafter.

In operation, with the switches 328 and 498 in circuit closing positions and the controllers 34, 86, 166, 168, 170 and 172 in the positions shown, the electrodes 16, 18 and 20 are manually lowered towards the charge 14 in the furnace 10 by operation of the master controller 86 or the individual controllers 166, 168 and 170 as will be explained more fully hereinafter until current flows through the electrodes. As soon as current flows in the electrodes, the regulating system assumes control of the positioning of the electrodes for maintaining a balance between the current and potential of the arc for different rates of input thereto, while effecting a limitation in the power factor of the arc and in the kilowatt load demand of the furnace.

When current flows through the electrodes and an arc is struck, the primary windings of the auto-transformers 350, 360 and 370 are energized in accordance with the current flowing in conductors 26, 24 and 22, respectively, the energizing circuits for the transformers extending from ground through current transformers 398, 400 and 402, respectively, conductors 392, 394 and 396, respectively, contact members 384, 386 and 388, respectively, of the demand switch 390, conductors 372, 376 and 380, respectively, through the primary windings of auto-transformers 350, 360 and 370, respectively, and conductors 348, 358 and 368, respectively, to the interconnected segments 334, 336 and 338, respectively, and from thence through segment 340 to ground.

With the primary windings of the auto-transformers thus energized, the field windings 148, 140 and 132 of the exciter generators are supplied through circuits extending from ground through segment 340 of the controller 172, the segments 334, 336 and 338, respectively, conductors 348, 358 and 368, respectively, secondary windings of the auto-transformers 350, 360 and 370, respectively, conductors 404, 406 and 408, respectively, contact members 190, 236 and 230, respectively, of the individual controllers 170, 168 and 166, respectively, conductors 410, 412 and 414, respectively, segments 248, 244 and 240, respectively, of the master controller 86 and conductors 416, 418 and 420, respectively, to one of the input terminals of rectifiers 158, 156 and 154, respectively, the other input terminal of which is connected by conductors 422, 424 and 426, respectively, through contact members 198, 234 and 228, respectively, of controllers 170, 168 and 166, conductors 428, 430 and 432, respectively, to the common segment 286 of controller 86 and from thence through conductor 434 to ground. By supplying rectifiers 154, 156 and 158 in this manner, the field windings 132, 140 and 148, respectively, are energized in accordance with the arc current flowing in conductors 22, 24 and 26, respectively.

When the arc is struck, the field windings 130, 138 and 146 of the exciter generators 112, 114 and 116, respectively, are also energized in accordance with the potentials of the arcs struck from electrodes 16, 18 and 20, respectively, to the charge 14. The field windings 130, 138 and 146 are connected across rectifiers 160, 162 and 164, respectively, which are connected to be supplied through circuits extending from conductors 22, 24 and 26, respectively, through conductors 472, 474 and 476, respectively, a section of resistors 458, 468 and 470, respectively, conductors 442, 452 and 460, respectively, the groups of segments 436, 438 and 440, respectively, of the controller 172, conductors 448, 458 and 466, respectively, conductors 478, 480 and 482, respectively, contact members 226, 232 and 186, respectively, of controllers 166, 168 and 170, conductors 484, 486 and 488, respectively, segments 238, 242 and 246, respectively, conductors 490, 492 and 494, respectively, rectifiers 160, 162 and 164, respectively, and through conductors 426, 424 and 422, respectively, which are common to rectifiers 154, 156 and 158, respectively, to ground as described in giving the circuits for energizing the rectifiers 154, 156 and 158.

The balance between the field windings 130, 138 and 146 of the exciter generators 112, 114 and 116, respectively, and the field windings 132, 140 and 148, respectively, controls the operation of the motors 62, 64 and 66, respectively, for positioning the electrodes 16, 18 and 20, respectively. Thus if the arc current is high, relative to the value desired, the current responsive field windings 132, 140 and 148 are energized to a greater degree than the opposed potential responsive field windings 130, 138 and 146, respectively, and the flux produced by the current responsive field windings will be so great as to cause the exciting generators to develop a voltage having a polarity such as to energize the field windings 118, 120 and 122 of the main generators 100, 102 and 104, respectively, in a direction to impress a voltage on the motor armatures 74, 76 and 78, respectively, to cause the motors 62, 64 and 66 to operate in a direction to raise the electrodes 16, 18 and 20, respectively.

In a similar manner if the arc potential is large with respect to the value desired and if the arc current is low, then the flux developed by the control field windings 130, 138 and 146 is larger than that developed by the field windings 132, 140 and 148, respectively, and the polarity of the voltage developed by the exciter generators 112, 114 and 116, respectively, will be reversed, thus impressing a voltage on the armatures 74, 76 and 78, respectively, to effect an operation of motors 62, 64 and 66, respectively, to cause the electrodes 16, 18, and 20, respectively, to be lowered. When the flux developed by the two control field windings of each of the exciter generators is balanced, thus neutralizing each other, the motors controlled by the exciter generators are at rest.

If during the normal operation of the regulating system, the operator desires to change the input to the furnace, he may do so by actuating the controller 172 to any one of its four positions indicated. Assume, for example, that the operator moves the controller 172 from position 1 illustrated in the drawing as the initial or starting position to position 2. Upon such a movement of the controller 172, three things occur simultaneously.

The movement of controller 172 causes the segment 290 to engage contact finger 298 to close the circuit extending from the positive terminal of a separate source of supply through segments 288 and 290, contact finger 298, conductor 306, contact member 314, conductor 320, the parallel circuit formed of the windings 322 and 326 through the switch 328 to the negative terminal of the separate source of supply. Thus the winding 326 of the circuit breaker 42 is immediately energized to actuate the circuit breaker 42 to a circuit opening position.

After a predetermined time delay depending upon the time delay characteristics of the windings 326 and 322, the contactor 324 is so energized that it moves to a circuit closing position to establish the motor operating circuit for motor 48 to drive the controller 34 to its second position corresponding to position 2 of the controller 172. At the same time, the cam 330 is driven in a clockwise direction until it engages and actuates the spring biased contact member 314 to a circuit opening position where the circuit to the energizing windings 326 and 322 is interrupted to effect the deenergization thereof and the motor 48 is stopped and the circuit breaker 42 is again biased to a circuit closing position to supply the primary windings of the power transformer 30.

Simultaneous with the engagement of the segment 290 and contact finger 298 upon the movement of the controller 172, the second segment of each of the groups 334, 336 and 338 of interconnecting segments is moved to a position to be electrically connected with conductors 346, 356 and 366, respectively, thereby removing a section of the primary winding of auto-transformers 350, 360, 370, respectively, from the circuit with the current transformers 398, 400 and 402, respectively.

At the same time the second segment of the independent groups 436, 438 and 440 of segments of the controller 172 is actuated to a position to engage conductors 444, 454 and 462, respectively, to connect additional sections of the resistors 458, 468 and 470, respectively, in the supply circuit for supplying rectifiers 160, 162 and 164, respectively. Thus the change in the primary windings of the auto-transformers 350, 360 and 370 and in the setting of the resistors 458, 468 and 470 is effected while the circuit breaker 42 is in a circuit opening position and before power is again supplied to the power transformer 30.

By effecting the change in the auto-transformers 350, 360 and 370 and in the resistors 458, 468 and 470, it is possible to maintain a balance in the relationships of the current flowing in the opposed control field windings of each of the exciter generators 112, 114 and 116 for the different settings of the power transformer 30. By connecting the auto-transformers 350, 360 and 370 in the manner indicated whereby equal changes are made in the setting of each of them simultaneously, it is possible to make the auto-transformers deliver balanced currents to the control field windings connected thereto over the entire normal range of adjustments of the auto-transformers.

In connection with the auto-transformers 350, 360 and 370, it is to be noted that for a given furnace and power transformer that there is a current in the furnace conductors 22, 24 and 26 that corresponds to the maximum power that can be delivered to the arc furnace. Thus where the primary winding of the power transformer 30 has a number of taps as illustrated in the drawing, there is a corresponding arc current for each of these voltages which will give a substantially constant power factor with the most desirable characteristics of power delivered to the arc furnace. By utilizing the auto-transformers 350, 360 and 370 mechanically connected for adjustment simultaneously with the adjustments of the primary windings of the power transformer as described hereinbefore and by properly selecting the taps to the auto-transformers, it is possible to effect the changes in the setting of the auto-transformers so as to give maximum current settings for the arc furnace.

Thus by moving the controller 172 to effect an increase in the power input to the arc furnace, it is found that it is possible to only put in power to the furnace up to the limit, as determined by the setting of the taps of the auto-transformers 350, 360 and 370. This is apparent because for every change in the setting of the power transformer 30 there is a corresponding change in the setting of the auto-transformers 350, 360 and 370 to effect a change in the energization of the control field windings 148, 140 and 132, respectively, to effect an operation of the motors 66, 64 and 62, respectively, to correctly position the electrodes 20, 18 and 16, respectively, to maintain an arc which will draw the current corresponding to the power factor which it is desired to maintain substantially constant.

If for some unknown reason the power supplied to the furnace should become larger than a predetermined value, then the demand meter 502 is so energized that its contact member 500 is actuated to a circuit closing position and the winding 496 of the demand switch 390 is so energized as to actuate contact members 384, 386 and 388 upwardly away from the first circuit closing position to a second circuit closing position. When the demand meter is actuated in this manner, an additional section of the primary windings of each of the auto-transformers 350, 360, 370 is connected in circuit to so change the output of the auto-transformers 350, 360, 370 as to effect an increase in the energization of the control field windings 148, 140 and 132, respectively, whereby the motors 66, 64 and 62, respectively, are operated to effect a raising of the electrodes 20, 18 and 16, respectively, to a point where the furnace is operated at a lighter kilowatt load. This is an additional feature that is highly desirable where the power is being purchased from some outside supplier under penalties for exceeding predetermined values of power supply.

If during the normal regulating operation of the system of this invention, it is desired to raise any one of the electrodes 16, 18 and 20 independently of the other two, as, for example, if it is desired to raise the electrode 20, then the individual controller 170 associated with electrode 20 is actuated to its "raise" position from the automatic position illustrated. This is accomplished by turning the manual control 192 to the "off" position where the finger 194 is in alignment with the notch 204 in the stop member 198, after which the spring 200 effects a longitudinal sliding of the drum 174 to a position where the segments of the controller 170 are aligned for engaging certain contact fingers associated therewith. As the finger 194 passes through the notch 204, the contact members 186, 188 and 190 are actuated to circuit opening positions to disconnect the rectifiers 158 and 164 from their sources of supply.

After being disconnected from the automatic position, the segments 180, 182 and 184 are actuated to the "raise" position where they engage cooperating contact fingers establishing a circuit extending from the positive terminal of a constant source of supply, not shown, through conductors 508, 510, segment 184, conductors 512 and 416 to an input terminal of the rectifier 158 and from the other input terminal of the rectifier 158 through conductors 422 and 514, segment 182 and conductor 516, through resistor 518 to the negative terminal of the constant source of supply. It is to be noted that the circuit to the rectifier 164 is interrupted under these circumstances. It is to be noted also that the segment 180 shunts the auto-transformer 350 in that it establishes a circuit extending from the conductor 392, through conductor 540, segment 180 of controller 170 and conductors 546 and 434 to ground. With the rectifier 158 being supplied in this manner, the control field winding 148 is the only active control field winding energized to excite the exciter generator 116, whereby the motor 66 is operated to raise the electrode 20.

If on the other hand it is desired to lower the electrode 20 independent of the automatic operation of electrodes 16 and 18, then the drum 174 is actuated to a "lower" position where the segments 176 and 178 establish circuits extending from the positive source of supply through conductors 508 and 510, segment 178, conductors 514 and 422 to an input terminal of the rectifier 164, the other input terminal of the rectifier 164 being connected by conductor 494 to and through conductor 520, segment 176, conductor 516 and the resistor 518 to the negative terminal of the separate source of supply. Under these conditions, the circuit to the rectifier 158 is interrupted and the rectifier 164 supplies the control field winding 146 to so control the exciter generator 116 as to effect an operation of the motor 66 to lower the electrode 20.

It is to be understood that independent control of the positioning of either electrode 16 or 18 may be had in a similar manner to that of electrode 20 through the operation of independent controllers 166 and 168, respectively, each of these controllers being similar in construction and being operative to establish circuits for the control field windings of exciter generators 112 and 114, respectively, which are similar to and correspond to the circuits established by a movement of controller 170 to "raise" or "lower" positions.

If during the operation of the furnace, it is desired to effect a simultaneous change in the positioning of the electrodes 16, 18 and 20, this may be accomplished by movement of the master controller 86 to either its "raise" or "lower" position. For example, if it is desired to effect the simultaneous raising of the electrodes, the controller 86 is actuated to its "raise" position where the segments 250, 252, 254, 256, 258, 260, 262, 264 and 266 are aligned with cooperating contact fingers to establish circuits, and the segments 80, 82, 84 are moved to circuit opening positions whereby the shunts about resistors 88, 90 and 92, respectively, are interrupted and the field windings 68, 70 and 72 of the motors 62, 64 and 66, respectively, are connected through resistors 68, 90 and 92, respectively, to effect a field forcing of the electrode motors.

The movement of the master controller 86 to the "raise" position effectively shunts the normal source of supply for the rectifiers 154, 156 and 158, respectively, and establishes energizing circuits which may be traced from the positive terminal of the separate source of supply, not shown, through conductors 522, 524 and 508, respectively, segments 254, 260 and 266, respectively, conductors 420, 418 and 416, respectively to one of the input terminals of rectifiers 154, 156 and 158, respectively, and from the other input terminal of the rectifiers through conductors 426, 424 and 422, respectively, segments 252, 258 and 264, respectively, conductors 526, 528 and 530, respectively, and resistors 532, 534 and 518, respectively, to the negative terminal of the separate source of supply. At the same time, it is seen that the segments 250, 256 and 262 of controller 86 effectively shunts the auto-transformers 370, 360 and 350, respectively, the shunting circuits being traced through conductors 396, 394 and 392, respectively, conductors 536, 538 and 540, respectively, segments 250, 256 and 262, respectively, conductors 542, 544 and 546, respectively, through the common conductor 434 to ground. The movement of the segments 238, 242 and 246 effectively interrupts the normal supply circuit to the rectifiers 160, 162 and 164, respectively, whereby only the control field windings 132, 140 and 148 are energized to so excite the exciter generators 112, 114 and 116, respectively, as to effect the simultaneous operation of the motors 62, 64 and 66 to simultaneously raise the electrodes 16, 18 and 20.

If on the other hand it is desired to effect a simultaneous lowering of the electrodes 16, 18 and 20, then the master controller 86 is moved to the "lower" position indicated where again the segments 80, 82 and 84 are actuated to interrupt the shunts around the resistors 88, 90 and 92 and the resistors are thereby connected in the field winding circuit of the motors 62, 64 and 66, respectively, to effect a field forcing action thereof and segments 268, 270, 272 to 274, 276, 278, 280, 282 and 284 are actuated to circuit closing positions. As in the "raise" position of the controller 86 corresponding segments are provided in the "lower" position for shunting the auto-transformers 350, 360 and 370. These segments 268, 274 and 280 function in the same manner as the segments 250, 256 and 262, respectively, in effecting the shunting of the auto-transformers 370, 360 and 350, respectively.

With the controller in the "lower" position, circuits are established extending from the positive terminal of the separate source of supply through conductors 522, 524 and 508, respectively, segments 272, 278 and 284, respectively, conductors 426, 424 and 422, respectively, to one of the input terminals of the rectifiers 160, 162 and 164, respectively, and from the other input terminal of the rectifiers through conductors 490, 492 and 494, respectively, segments 270, 276 and 282, respectively, conductors 526, 528 and 530, respectively, through the resistors 532, 534 and 518, respectively, to the negative terminal of the separate source of supply. The movement of the segments 240, 244 and 248 as the controller is actuated to its "lower" position effectively interrupts the supply circuit to the rectifiers 154, 156 and 158, respectively, whereby the control field windings 132, 140 and 148 are not energized and the excitation of the exciter generators 112, 114 and 116, respectively, is controlled entirely by the energization of the field windings 130, 138 and 146, respectively, supplied by the rectifiers 160, 162 and 164, respectively. With the energization of the exciter generators controlled in this manner, the motors 62, 64 and 66 are so operated as to effect a simultaneous lowering of the electrodes 16, 18 and 20.

The regulating system of this invention is very efficient in controlling the positioning of the electrodes either simultaneously or independently and by providing the controller 172, as described and referred to, it is possible to automatically adjust the regulating apparatus in accordance with the change in the input to the furnace to maintain positional control of the electrodes while at the same time effect a limitation in the power factor. The additional feature of the simultaneous change in the setting of the auto-transformers in accordance with the demand further effects an efficient operation of the system for maintaining the demand within predetermined limitations.

In practice, it has been found that the settings of the auto-transformers 370, 360 and 350 can be roughly made in the factory without knowing the exact characteristics of the furnace and at the time of installing the system, the taps can be set by the empirical method to a position which will suit the furnace conditions and the entire electrical installation. By controlling the auto-transformers simultaneously with the input to the power transformer, it is evident that the selection of the taps are predetermined by the electrician in charge of the installation and that the furnace operating personnel, which are usually unskilled, will not be able to make any changes that might be detrimental to the power consumption of the electrical system.

While the operation of the system has been described with reference to the changing of the position of the controller 172 from only the first position to the second position, it is, of course, to be understood that the same conditions apply for movement of the controller to any one of the four positions indicated. In practice it may be desirable to have more than four positions for the controller 172 and if this is the case, such changes can be made without in any way detracting from the present invention.

We claim as our invention:

1. In a control system for regulating the feeding of an electrode for producing and maintaining an electric arc, the combination comprising, a motor disposed for raising and lowering the electrode, a generator connected to control the operation of the motor, the generator having two opposed field windings, a control transformer connected to be energized in accordance with the current flowing through the electrode arc, the control transformer being associated with one of the opposed field windings and disposed to be connected in circuit therewith to effect the energization thereof, switching means responsive to predetermined electrical conditions of the electrode circuit for effecting a change in the connections of the control transformer to effect an increase in the energization of the one of the opposed field windings, the other of the opposed field windings being disposed to be energized in accordance with the potentional across the electrode arc, the opposed field windings cooperating to control the excitation of the generator and the positioning of the electrode.

2. In a control system for regulating the feeding of an electrode in an arc furnace for producing and maintaining an electric arc, the combination comprising, a power transformer for supplying power to the furnace, a motor disposed for raising and lowering the electrode, a generator connected to control the operation of the motor, the generator having a pair of opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, the other of the opposed field windings being disposed to be energized in accordance with the potential across the electrode arc, an adjustable resistor in circuit with the other of the opposed field windings, and means for simultaneously adjusting the resistor and the primary winding of the control transformer to maintain a predetermined relation therebtween for maintaining a predetermined energization of the opposed field windings under different operating conditions of the power transformer.

3. In a control system for regulating the feeding of an electrode in an arc furnace for producing and maintaining an electric arc, the combination comprising, a power transformer for supplying power to the furnace, a motor disposed for raising and lowering the electrode, a generator connected to control the operation of the motor, the generator having a pair of opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, means responsive to predetermined electrical conditions of the electrode circuit for effecting a change in the output of the control transformer to increase the energization of the one of the opposed field windings, the other of the opposed field windings being disposed to be energized in accordance with the potential across the electrode arc, an adjustable resistor in circuit with the other of the opposed field windings, and means for simultaneously adjusting the resistor and the primary winding of the control transformer to maintain a predetermined relation therebtween for maintaining a predetermined energization of the opposed field windings under different operating conditions of the power transformer.

4. In a control system for regulating the feeding of an electrode in an arc furnace for producing and maintaining an electric arc, the combination comprising, a power transformer for supplying power to the furnace, the power transformer having an adjustable primary winding, a motor disposed for raising and lowering the electrode, a generator connected to control the operation of the motor, the generator having two opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, the other of the opposed field windings being disposed to be energized in accordance with the potential across the electrode arc, an adjustable resistor in circuit with the other of the opposed field windings, and means for simultaneously adjusting the resistor and the primary windings of the power transformer and the control transformer to maintain a predetermined relation between the setting of the resistor and the adjustment of the control transformer for the diferent adjustments of the primary winding of the power transformer.

5. In a control system for regulating the feeding of an electrode for producing and maintaining an electric arc, the combination comprising a motor disposed for raising and lowering the electrode, a generator connected to control the operation of the motor, the generator having two opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, the other of the opposed field windings being disposed to be energized in accordance with the potential across the electrode arc, an adjustable resistor in circuit with the other of the opposed field windings, means for simultaneously adjusting the resistor and the primary winding of the control transformer to maintain a predetermined relation therebetween under predetermined operating conditions, and means for selectively controlling the energization of the opposed field windings independently of the adjustment of the control transformer and the resistor to effect an operation of the motor to move the electrode in a predetermined manner.

6. In a control system for regulating the feeding of an electrode for producing and maintaining an electric arc, the combination comprising, a motor disposed for raising and lowering the electrode, a generator connected to control the operation of the motor, the generator having two opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, means responsive to predetermined electrical conditions of the electrode circuit for effecting a change in the output of the control transformer to increase the energization of the one of the opposed field windings, the other of the opposed field windings being disposed to be energized in accordance with the potential across the electrode arc, an adjustable resistor in circuit with the other of the opposed field windings, means for simultaneously adjusting the resistor and the primary winding of the control transformer to maintain a predetermined relation therebetween under predetermined operating conditions, and means for selectively controlling the energization of the opposed field windings independently of the adjustment of the control transformer and the resistor to effect an operation of the motor to move the electrode in a predetermined manner.

7. In a control system for regulating the feeding of an electrode in an arc furnace for producing and maintaining an electric arc, the combination comprising, a power transformer for supplying power to the furnace, the power transformer having an adjustable primary winding, a motor disposed for raising and lowering the electrode, a generator connected to control the operation of the motor, the generator having two opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, means responsive to predetermined electrical conditions of the electrode circuit for effecting a change in the output of the control transformer to increase the energization of the one of the opposed field windings, the other of the opposed field windings being disposed to be energized in accordance with the potential across the electrode arc, an adjustable resistor in circuit with the other of the opposed field windings, and means for simultaneously adjusting the resistor and the primary windings of the power transformer and the control transformer to maintain a predetermined relation between the setting of the resistor and the adjustment of the control transformer for the different adjustments of the primary winding of the power transformer.

8. In a control system for regulating the feeding of a plurality of electrodes for producing and maintaining electric arcs, the combination comprising, a plurality of motors, each disposed for raising and lowering one of the electrodes, a plurality of generators, each generator having a pair of opposed field windings and being connected to control the operation of one of the motors, a plurality of control transformers, each of the control transformers being connected to be energized in accordance with the current flowing through one of the electrode arcs, each of the control transformers being associated with one of the opposed field windings of one of the pairs and disposed to be connected in circuit therewith to effect the energization thereof, switching means responsive to predetermined electrical conditions of the electrode circuits for simultaneously effecting a change in the connections of each of the control transformers to effect an increase in the energization of the one of the opposed field windings of each pair, the other of the opposed field windings of each pair being disposed to be energized in accordance with the potential across the electrode arc with which the one of the pair is associated, the opposed field windings of each pair cooperating to control the excitation of the associated generator and the positioning of the associated electrode.

9. In a control system for regulating the feeding of a plurality of electrodes in an arc furnace for producing and maintaining electric arcs, the combination comprising, a power transformer for supplying power to the furnace, a plurality of motors, each disposed for raising and lowering one of the electrodes, a plurality of generators, each of the generators having a pair of opposed field windings and being connected to control the operation of one of the motors, a plurality of control transformers, each of the control transformers having adjustable windings connected to be energized in accordance with the current flowing through one of the electrode arcs and disposed to be connected to one of the opposed field windings of one of the generators to energize the winding, the other of the opposed field windings of said one generator being disposed to be energized in accordance with the potential across said one of the electrode arcs, a plurality of adjustable resistors, each of the adjustable resistors being connected in circuit with one of the other of the opposed field windings of one of the generators, and means for simultaneously adjusting each of the resistors and the windings of each of the control transformers to maintain a predetermined relation between the resistor and control transformer associated with each pair of opposed field windings to maintain a predetermined energization thereof under different operating conditions of the power transformer.

10. In a control system for regulating the feeding of a plurality of electrodes in an arc furnace for producing and maintaining electric arcs, the combination comprising, a power transformer for supplying power to the furnace, a plurality of motors, each disposed for raising and lowering one of the electrodes, a plurality of generators, each of the generators having a pair of opposed field windings and being connected to control the operation of one of the motors, a plurality of control transformers, each of the control transformers having adjustable windings connected to be energized in accordance with the current flowing through one of the electrode arcs and disposed to be connected to one of the opposed field windings of one of the generators to energize the winding, the other of the opposed field windings of said one generator being disposed to be energized in accordance with the potential across said one of the electrode arcs, a plurality of adjustable resistors, each of the adjustable resistors being connected in circuit with one of the other of the opposed field windings of one of the generators, means for simultaneously adjusting each of the resistors and the windings of each of the control transformers to maintain a predetermined relation between the resistor and control transformer associated with each pair of opposed field windings to maintain a predetermined energization thereof under different operating conditions of the power transformer, and means for selectively controlling the energization of the pair of opposed field windings independently of the resistor and control transformer associated with each pair of opposed field windings.

11. In a control system for regulating the feeding of a plurality of electrodes in an arc furnace for producing and maintaining electric arcs, the combination comprising, a power transformer for supplying power to the furnace, a plurality of motors, each disposed for raising and lowering one of the electrodes, a plurality of generators, each of the generators having a pair of opposed field windings and being connected to control the operation of one of the motors, a plurality of control transformers, each of the control transformers having adjustable windings connected to be energized in accordance with the current flowing through one of the electrode arcs and disposed to be connected to one of the opposed field windings of one of the generators to energize the winding, the other of the opposed field windings of said one generator being disposed to be energized in accordance with the potential across said one of the electrode arcs, a plurality of adjustable resistors, each of the adjustable resistors being connected in circuit with one of the other of the opposed field windings of one of the generators, means for simultaneously adjusting each of the resistors and the windings of each of the control transformers to maintain a predetermined relation between the resistor and control transformer associated with each pair of opposed field windings to maintain a predetermined energization thereof under different operating conditions of the power transformer, and means for simultaneously controlling the energization of each of the pairs of opposed field windings independently of the resistor and control transformer associated with each pair to effect a simultaneous operation of the motors to simultaneously move the electrodes in a predetermined manner.

12. In a control system for regulating the feeding of a plurality of electrodes in an arc furnace for producing and maintaining electric arcs, the combination comprising, a power transformer for supplying power to the furnace, a plurality of motors, each disposed for raising and lowering one of the electrodes, a plurality of generators, each of the generators having a pair of opposed field windings and being connected to control the operation of one of the motors, a plurality of control transformers, each of the control transformers having adjustable windings connected to be energized in accordance with the current flowing through one of the electrode arcs and disposed to be connected to one of the opposed field windings of one of the generators to energize the winding, the other of the opposed field windings of said one generator being disposed to be energized in accordance with the potential across said one of the electrode arcs, a plurality of adjustable resistors, each of the adjustable resistors being connected in circuit with one of the other of the opposed field windings of one of the generators, means for simultaneously adjusting each of the resistors and the windings of each of the control transformers to maintain a predetermined relation between the resistor and control transformer associated with each pair of opposed field windings to maintain a predetermined energization thereof under different operating conditions of the power transformer, and means for independently controlling the energization of any one of the pairs of opposed field windings independently of the resistor and control transformer associated therewith to effect an operation of the motor associated therewith to move the electrode actuated thereby in a predetermined manner.

13. In a control system for regulating the feeding of an electrode in an arc furnace for producing and maintaining an electric arc, the combination comprising, a power transformer for supplying power to the furnace, the power transformer having an adjustable primary winding, a motor disposed for raising and lowering the electrode, a generator connected to control the operation of the motor, the generator having two opposed field windings, a control transformer having an adjustable primary winding connected to be energized in accordance with the current flowing through the electrode arc, the control transformer having secondary windings associated with one of the opposed field windings and disposed to be connected therewith to effect the energization thereof, means responsive to predetermined electrical conditions of the electrode circuit for effecting a change in the output of the control transformer to increase the energization of the one of the opposed field windings, the other of the opposed field windings being disposed to be energized in accordance with the potential across the electrode arc, an adjustable resistor in circuit with the other of the opposed field windings, means for simultaneously adjusting the resistor and the primary windings of the power transformer and the control transformer to maintain a predetermined relation between the setting of the resistor and the adjustment of the control transformer for the different adjustments of the primary winding of the power transformer, and means for selectively controlling the energization of the opposed field windings independently of the adjustment of the control transformer and the resistor to effect an operation of the motor to move the electrode in a predetermined manner.

14. In a control system for regulating the feeding of an electrode for producing and maintaining an electric arc, the combination comprising, a motor disposed for raising and lowering the electrode, a generator connected to control the operation of the motor, the generator having two opposed field windings, a control transformer connected to be energized in accordance with the current flowing through the electrode arc, the control transformer being associated with one of the opposed field windings and disposed to be connected in circuit therewith to effect the energization thereof, switching means disposed for operation to change the connections of the control transformer, a demand meter responsive to predetermined electrical conditions of the electrode circuit for effecting an operation of the switching means and thereby change the output of the transformer to increase the energization of the one of the opposed field windings, the other of the opposed field windings being disposed to be energized in accordance with the potential across the electrode arc, the opposed field windings cooperating to control the excitation of the generator and the positioning of the electrode.

15. In a control system for regulating the feeding of an electrode for producing and maintaining an electric arc, the combination comprising, a motor disposed for raising and lowering the electrode, a generator connected to control the operation of the motor, the generator having two opposed field windings, a control transformer connected to be energized in accordance with the current flowing through the electrode arc, the control transformer being associated with one of the opposed field windings and disposed to be connected in circuit therewith to effect the energization thereof, switching means disposed for operation to change the connections of the control transformer, a demand meter responsive to predetermined electrical conditions of the electrode circuit for effecting an operation of the switching means and thereby change the output of the transformer to increase the energization of the one of the opposed field windings, the other of the opposed field windings being disposed to be energized in accordance with the potential across the electrode arc, the opposed field windings cooperating to control the excitation of the generator and the positioning of the electrode, and means for selectively controlling the energization of the opposed field windings independently of the demand meter to effect an operation of the motor to move the electrode in a predetermined manner.

16. In an electric arc furnace, a power circuit including a power transformer having an adjustable tapped primary winding and at least a pair of electrodes across which current flows to produce an arc during operation of the furnace, a first control circuit means operative in response to the relative values of arc current and arc voltage, means responsive to said first circuit control means for varying the circuit characteristics of the power circuit, an adjustable current control means in circuit relation with said first control circuit means, and means for simultaneously adjusting the current control means and the primary windings of the power transformer to modify the operation of the first control circuit means in accordance with the change in the power input of the power transformer.

17. In an electric arc furnace, a power circuit including a power transformer having an adjustable tapped primary winding and at least a pair of electrodes across which current flows to produce an arc during operation of the furnace, a first control circuit means operative in response to the relative values of arc current and arc voltage, means responsive to said first circuit control means for varying the circuit characteristics of the power circuit, an adjustable current control means in circuit relation with said first control circuit means, means for effecting an adjustment of the tapped primary windings of the power transformer to change the input to the furnace, and means interlocked with said adjusting means for effecting a simultaneous adjustment of the current control means when an adjustment is made in the primary windings to modify the operation of the first control circuit means in accordance with the change in the power input of the power transformer.

18. In a control system for regulating the feeding of an electrode in an arc furnace for producing and maintaining an electric arc, the combination comprising, a power transformer for supplying power to the furnace, the power transformer having an adjustable tapped primary winding, a motor disposed for raising and lowering the electrode, means connected to control the operation of the motor, the control means having a pair of opposed control windings, one of the opposed windings being disposed to be energized in accordance with the arc current, a current control device adjustably connected in circuit with said one of the opposed windings, the other of the opposed field windings being disposed to be energized in accordance with the potential across the electrode arc, and means for simultaneously adjusting the current control device and the primary windings of the power transformer to effect a change in the energization of said one of the opposed windings to control the positioning of the electrode to produce an arc current for the adjusted tap voltage of the primary winding to give a substantially constant power factor at the maximum power input for each adjustment of the primary windings.

RALPH A. GEISELMAN.
JAMES P. HOUCK.

REFERENCES CITED

The following references are of record in the file of this patent:

UNITED STATES PATENTS

| Number | Name | Date |
|---|---|---|
| 2,375,039 | Reichert | May 1, 1945 |

FOREIGN PATENTS

| Number | Country | Date |
|---|---|---|
| 629,620 | France | Aug. 1, 1927 |